Sept. 1, 1925.  
S. O. HULETT  
DIFFERENTIAL  
Filed Aug. 9, 1924
1,552,305
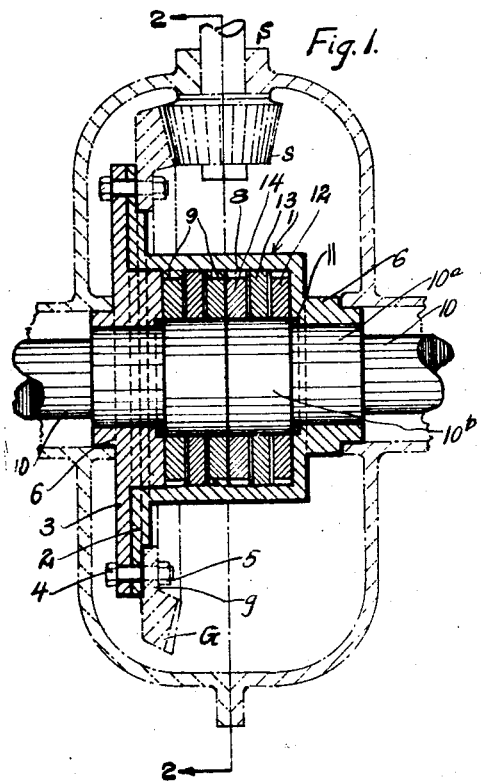
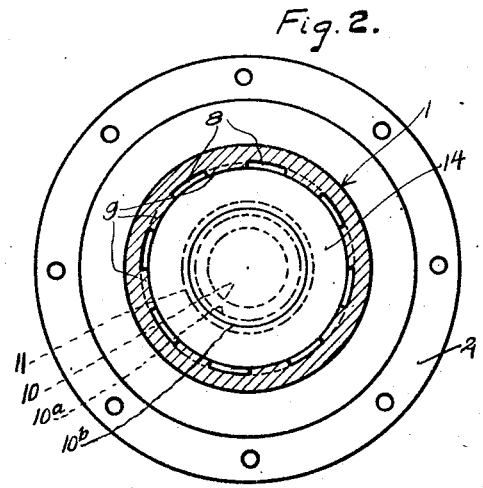
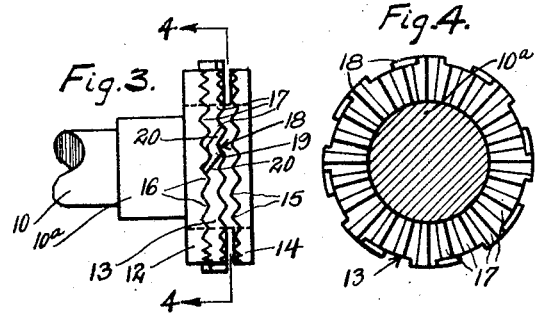
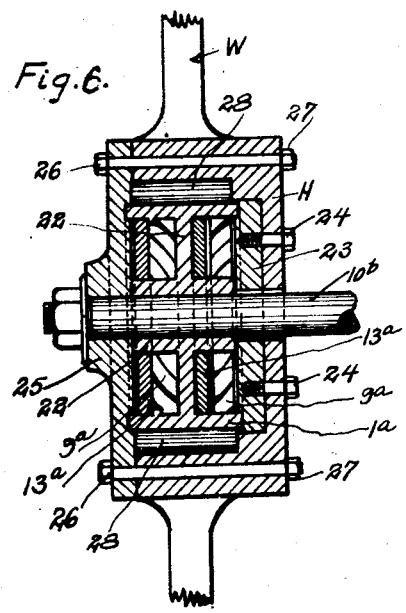
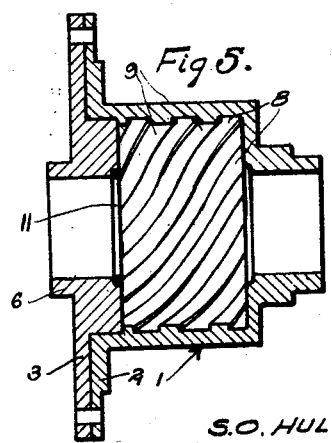
S. O. HULETT, INVENTOR  
BY Victor J. Evans  
ATTORNEY Patented Sept. 1, 1925.

1,552,305

UNITED STATES PATENT OFFICE.

SNOE O. HULETT, OF KANE, PENNSYLVANIA.

DIFFERENTIAL.

Application filed August 9, 1924. Serial No. 731,113.

*To all whom it may concern:*

Be it known that I, SNOE O. HULETT, a citizen of the United States, residing at Kane, in the county of McKean and State of Pennsylvania, have invented new and useful Improvements in Differentials, of which the following is a specification.

This invention relates to differentials, and more particularly to a differential specially adapted for use in connection with automobiles, though it may also be used for other purposes.

One of the main objects of the invention is to provide a differential of simple and inexpensive construction and efficient operation which may be readily applied to automobiles of standard construction. A further object is to provide a differential which is positive in its action and which does not employ in its construction springs or similar elements which are apt to break or get out of order. A further object is to provide a differential of the above character which can be applied directly to the wheel of the automobile, if desired, instead of to the inner ends of two sections of the axle. A still further object is to produce a differential of light weight and compact construction in which all gears are eliminated and which provides a positive drive for both wheels in both forward and reverse directions. Further objects will appear from the detail description.

In the drawings:—

Fig. 1 is a central horizontal section through the differential;

Fig. 2 is a section taken substantially on line 2—2 of Fig. 1;

Fig. 3 is an edge view of the drive and transmission plates;

Fig. 4 is a section taken substantially on line 4—4 of Fig. 3;

Fig. 5 is a central longitudinal section through the differential casing;

Fig. 6 is a section through the hub portion of an automobile wheel showing the manner in which the differential can be applied to a wheel.

In constructing my differential I provide a casing 1 provided at one end with a flange 2. This flange is provided with openings for reception of bolts 4 upon which are threaded nuts 5, these bolts also passing through flange 3ª of a closure plate 3 which fits into the open end of the casing, and through flange $g$ of a ring gear G which is mounted within housing C, this housing being of known construction and formed of two sections from each of which extends an anxle housing $c$. A drive shaft S extends into housing C and a pinion $s$ is secured on this shaft and meshes with gear ring G. This is a well known construction in the automobile art and need not be further described in detail. Plate 3 and casing 1 are each provided with a reduced neck 6 which fits into the end portion of housing $c$ which is suitably shaped for this purpose thus holding the casing 1 against endwise movement in housing C.

Casing 1 is provided, in its inner face, with a plurality of helical grooves 8 which form spaced ribs or threads 9, as illustrated in Fig. 5, and which may be of uniform or varying pitch, as desired or required by circumstances. Axles 10 are rotatably mounted through housings $c$ and extend into casing 1. Each axle is provided with an outer enlarged portion 10ª which fits snugly through neck 6 and with an inner enlarged portion 10ᵇ. Preferably, though not necessarily, a packing member or gasket 11 of felt or any other suitable or preferred material, is mounted in neck 6 and fits snugly about portion 10ª of the shaft so as to form a liquid-tight closure about the same. These gaskets serve to prevent escape of lubricant placed within casing 1.

Three plates 12, 13 and 14 are mounted on portion 10ᵇ of the shaft. Plate 12 is secured on the shaft at the outer end of portion 10ᵇ and plate 14 is secured on the shaft at the inner end of portion 10ᵇ, plate 13 being loose on the shaft. Plate 14 is provided, on its face adjacent the plate 13, with a plurality of radially disposed teeth or serrations 15, plate 12 being provided on its face adjacent the plate 13 with a plurality of similar serrations 16. Plate 13 is provided on both faces with serrations 17 which correspond to the serrations 15 and 16 of plates 12 and 14, respectively, it being noted that the serrations of these two plates are preferably disposed in alternative or staggered relation, though this is not essential. Plate 13 is further provided, on its outer edge, with a plurality of lugs or projections 18 each of which, in the form shown, includes a central substantially square body 19 and fingers 20 which extend in opposite directions from the diagonally opposite corners of the body, though these lugs may be of cylindrical or other preferred form. These lugs are disposed and adapted to engage in the grooves 8 of casing 1 so as to shift the central plate 13 toward or away from either of the plates 12 and 14 by contact of the lugs with threads 9 thus moving plate 13 into driving engagement with either plate 12 or 14 depending on the direction of rotation of casing 1. The lugs 18 of plates 13 are at all times engaged in grooves 8 of casing 1 so that by rotating the casing in proper direction these plates will be shifted for establishing driving connections between the axles 10 and the casing. Referring to Fig. 2, if the casing is rotated in a clockwise direction threads 9 will contact with the inclined surfaces of lugs 18 so as to force the left hand plate 13, as considered in Fig. 1, outwardly into engagement with plate 12, the serrations 17 on the outer face of plate 13 being forced into tight engagement with the serrations of plate 12, and the right hand plate 13 will be forced into operative engagement with its coacting inner plate 14, after which rotation of casing 1 will be imparted to shafts 10 through plates 12 and 13 and plates 13 and 14. In this manner rotation is imparted to both axles simultaneously when casing 1 is rotated. By reversing the direction of rotation of casing 1, left hand plate 13 will be forced out of contact with plate 12 and into operative engagement with its cooperating inner plate 14, and the right hand plate 13 will be disengaged from plate 14 and forced into operative engagement with its cooperating plate 12, thus rotating axles 10 in the opposite direction to that in which the axles were first rotated. In the event that either of the axles overruns the casing 1, as when making a turn, plate 13 will be moved out of operative engagement with either plate 12 or 14, as the case may be, and will be positioned between these two plates thus permitting the axle 10 and plates 12 and 14 to rotate independently of casing 1. Upon completion of the turn and when the rate of rotation of axle 10 tends to fall below the rate of rotation of casing 1, plate 13 will be returned into operative engagement with the disc with which it had formerly been engaged by the action of casing 1 and threads 9 and lugs 18. This provides a differential of very simple and highly efficient construction. As plates 13 are forced into tight contact with plates 12 or 14, as the case may be, and these plates are provided with interengaging serrations, the driving strains are evenly distributed throughout the plates and associated parts thus providing a differential of comparatively light construction which possesses great strength.

In Fig. 6 I have illustrated the manner in which this differential may be applied directly to the wheels of an automobile thus permitting a continuous axle to be employed instead of an axle in two sections as is the common practice. In this form of the differential, casing 1ᵃ is mounted in hub H of wheel W which may be of any suitable or preferred construction. The casing is divided into two sections by a central web 22 which connects the casing to a sleeve 23 which is secured on axle 10ᵇ in any suitable or preferred manner. This casing is provided with threads 9ᵃ at each side of web 22, the threads at one side of the web being directed oppositely to the threads at the other side. Plates 13ᵃ, similar to plates 13, are mounted in the casing at opposite sides of web 22 and have their outer faces serrated for engagement with a plate 23 secured by bolts 24, or in any other suitable or preferred manner, to hub H and a cover plate 25 secured over the outer end of the hub by bolts 26 and nuts 27, or in any other suitable or preferred manner. The inner faces of plates 23 and 25 are serrated for operative engagement with the serrated outer faces of plates 13ᵃ. When axle 10ᵇ is rotated in one direction the left hand plate, as considered in Fig. 6 is shifted into operative engagement with plate 25, the right hand plate being shifted into inoperative position adjacent to web 22, as illustrated, after which the wheel is rotated with the axle the right hand plate 13ᵃ remaining in inoperative position and rotating with casing 1ᵃ. When the direction of rotation of the axle is reversed the relative positions of the plates 13ᵃ will be reversed, as will be readily understood, thus ensuring positive drive of the wheel in either direction. In the event that the wheel overruns the casing 1ᵃ, as when making the turn, the plate 13ᵃ which is in operative position, will be backed out of engagement with plate 25 or 23, as the case may be, after which the wheel will rotate freely about casing 1ᵃ. To facilitate free rotation of the wheel about casing 1ᵃ I preferably provide suitable anti-friction bearings, such as roller bearings 28 between the casing and the wheel hub. After the turn is completed, the plate 13ᵃ which has been temporarily in inoperative position, is returned to operative position, the wheel being driven by the axle as before. This provides very simple and highly efficient means whereby a differential effect is obtained and a single continuous axle can be employed for positively driving both wheels in either direction.

What I claim is:—

1. In a differential of the character described, a casing, axles extending into the casing, a pair of plates secured on the respective axles, a plate mounted on each axle between the pair of plates carried thereby and freely slidable longitudinally of the axle in either direction, and cooperating means carried by the casing and the slidable plates for shifting the latter longitudinally of the axles into operative engagement with the plates secured on the axles upon rotation of the casing and in accordance with the direction in which said casing is rotated.

2. In a differential of the character described, a casing, axles extending into the casing, pairs of plates secured on the respective axles, plates slidably mounted on the axles between the plates of the respective pairs of plates and free to move on the axles in either direction, said movable plates being provided with lugs projecting outwardly radially thereof, the casing being provided with helical grooves receiving said lugs.

3. In a differential of the character described, a casing, axles extending into the casing, a pair of plates secured on the respective axles and having their opposed surfaces serrated, plates loosely mounted on each of the axles between the plates of said pairs of plates and having their opposite faces serrated, said loosely mounted plates having free sliding movement on the axles in either direction, and cooperating means carried by the casing and said movable plates for shifting the latter longitudinally of the axles upon and in accordance with rotation of the casing.

4. In a differential of the character described, a casing, axles extending into the casing, pairs of transmission plates secured on the respective axles, the plates of each pair having their opposed surfaces serrated, and drive plates loosely mounted on the axles between the respective pairs of transmission plates and having their opposite faces serrated, said drive plates being provided with radially projecting lugs and being freely movable on the axles toward and away from the transmission plates, the casing being provided with helical grooves receiving said lugs for shifting the drive plates into and out of engagement with the transmission plates.

5. In a differential of the character described, a casing, an axle extending into the casing, two transmission plates secured on the axle, and a drive plate loosely mounted on the axle for movement into and out of engagement with either of the transmission plates, said drive plate being freely slidable on the axle in either direction, the casing and the drive plate being provided with cooperating means for moving the drive plate into driving engagement with either of the transmission plates upon relative rotation between the casing and the drive plate.

In testimony whereof I affix my signature.

SNOE O. HULETT.